3,244,487
APPARATUS FOR AGEING ALKALI CELLULOSE
Keith Priday, deceased, late of Coventry, England, by Agnes Priday, Coventry, and Sidney Walter Clarence Priday, Gloucester, England, executors, and John Walter More, Kenilworth, England, assignors to Courtaulds Limited, London, England, a British company
Original application Feb. 2, 1960, Ser. No. 6,289. Divided and this application Dec. 18, 1964, Ser. No. 428,000
Claims priority, application Great Britain, Feb. 12, 1959, 4,901/59
2 Claims. (Cl. 23—283)

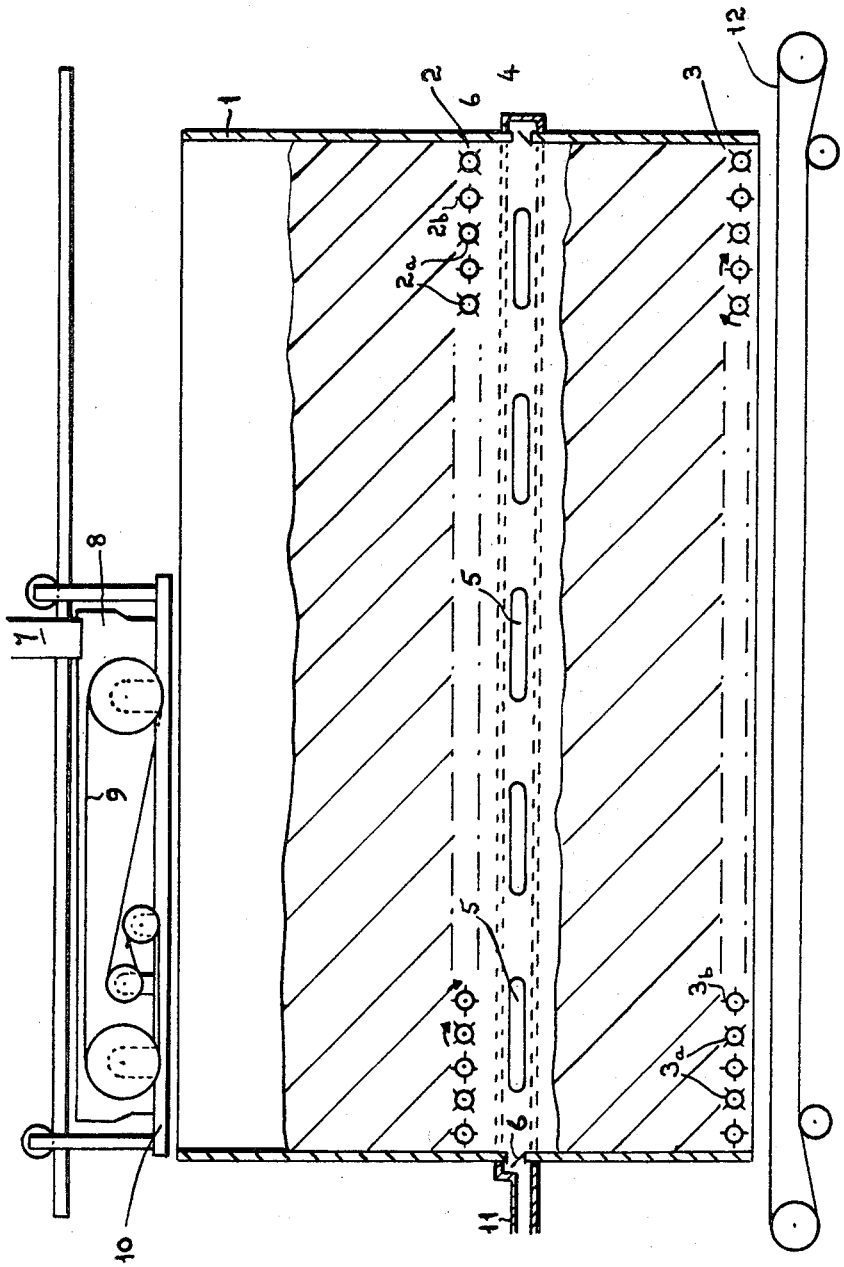

This application is a division of our copending application Serial No. 6,289, filed February 2, 1960, now abandoned.

This invention concerns the ageing of alkali cellulose and provides an apparatus suitable for that purpose.

In the production of viscose, the alkali cellulose obtained by subjecting cellulose to treatment with alkali is usually left to "age" for a period before subsequent xanthation. It has already been proposed to carry out the ageing by introducing the alkali cellulose at the top of a vertical tower and allowing the resulting mass of alkali cellulose to pass slowly down the height of the tower by removing alkali cellulose continuously or intermittently from the bottom of the tower. In this way, it may be ensured that the material uniformly takes a predetermined time in passing down the tower.

It is a known fact that the total depth of the mass of alkali cellulose in the tower is limited by factors other than the desired ageing time. A depth is reached beyond which no further ageing takes place.

The throughput of alkali cellulose in plants of this type can be increased by providing a further ageing tower or extending the dimensions of the tower laterally. In either case, additional floor-space must be available and further equipment must be provided for supplying alkali cellulose to the second tower or to the laterally extended upper end of the first tower.

We therefore have devised a process for affording a greater throughput per unit of cross-sectional area and an apparatus for carrying out that process.

According to the present invention, a process for ageing alkali cellulose comprises supplying alkali cellulose to the upper end of a vessel of uniform horizontal cross-section, allowing the alkali cellulose to pass down at least one part of the height of the vessel at a controlled rate by maintaining a mass of alkali cellulose in that part and continuously or intermittently removing alkali cellulose in discrete fragments from the lower face of the mass, bringing the removed alkali cellulose into contact with oxygen, e.g. in the form of an oxygen-containing gas, and thereafter allowing the alkali cellulose to pass down at least one further part of the height of the vessel at a controlled rate by maintaining a mass of alkali cellulose in that part and continuously or intermittently removing alkali cellulose in discrete fragments from the lower face of that mass.

The temperature of the alkali cellulose within the vessel is maintained substantially constant during the ageing. For example, a jacket may be provided which envelops the vessel and in which fluid may be circulated. A preferred method of controlling said temperature is by controlling the temperature at which the earlier step comprising steeping the cellulose in aqueous alkali is carried out. The vessel may then be lagged to reduce heat losses, the temperature being maintained in the vessel by the heat of reaction.

The alkali cellulose may be brought into contact with oxygen or an oxygen-containing gas after each ageing stage except the last, either by positively introducing the gas, e.g. air, or (less satisfactorily) by merely allowing ingress of air through one or more inlets or ports. A typical rate of flow for a positively-introduced air supply would be of the general order of 6 cu. ft./min. The gas may, if desired, be warm and/or humidified.

Apparatus according to the present invention for ageing alkali cellulose comprises a tower of uniform cross-section having a feed opening adjacent its upper end and a discharge opening adjacent its lower end, at least one extractor mechanism transversely disposed between the ends of the tower for removing discrete fragments of any alkali cellulose which comes into contact with the upper surface of said mechanism, a final extractor mechanism transversely disposed across the discharge opening for removing discrete fragments of any alkali cellulose which comes into contact with the upper surface of said final extractor mechanism, and a gas inlet below each of the extractor mechanisms except the final extractor mechanism.

Any or all of the extractor mechanisms may comprise a plurality of parallel rotary shafts, each carrying a plurality of pickers. The pickers may be in the form, for example, of rods or of toothed discs. A further form is described hereafter by reference to the accompanying drawing.

If desired, the alkali cellulose supplied to the upper end of the tower may be distributed over the surface of the upper mass. For example, a conveyor or a system of baffles may be employed for this purpose. The discharge of the "aged" alkali cellulose may be effected via a hopper below the final extractor mechanism and/or by means of a conveyor.

The invention will now be further described by reference to the accompanying drawing, which represents in longitudinal section apparatus according to the invention.

In the drawing, a tower 1 is provided adjacent its middle and bottom respectively with transverse extractor mechanisms 2 and 3. Each of the latter comprises a number of extraction rolls consisting of shafts 2a or 3a disposed in parallel across the width of the tower and carrying picker fingers 2b and 3b in the form of slats parallel to, and projecting radially from, the shafts. The extraction rolls are rotated intermittently during operation.

Below the first extractor mechanism 2, a duct 4 encircles the tower, communication between the duct and the interior of the tower being provided by inlet ports 5. The ports 5 are shielded by baffle 6, of which, for the sake of clarity, only two are shown in the drawing.

Steeped and shredded alkali cellulose is supplied to the tower via a chute 7, whence it drops into a spreader 8. The spreader 8 comprises a reversible conveyor belt 9, mounted upon a carriage 10. The carriage 10 reciprocates between two positions in which it lies directly above the opposite ends of the interior of the tower. From the position shown in the drawing the carriage 10 moves to the right, while the belt 9 is driven in a clockwise direction. When the carriage 10 is directly above the right-hand end of the tower interior, the carriage 10 begins to move back toward the position shown. Simultaneously, the belt 9 reverses. By means of the spreader 8, alkali cellulose is distributed uniformly over the cross-section of the tower 1.

During operation of the tower, a mass of alkali cellulose is built up above each of the extractor mechanisms and the rate of feed of fresh alkali cellulose and rate of intermittent rotation of the extraction rolls are controlled so as to maintain constant the depth of the each mass. By varying these rates together, it is possible to vary the length of time during which the "crumbs" of alkali cellulose are retained in each zone of the tower.

After passing through the first extractor mechanism 2, the alkali cellulose is subjected to aeration by contact with a slow current of air introduced via an air supply pipe 11, the duct 4, and the ports 5. The baffles 6 prevent crumbs of alkali cellulose entering the ports 5 and possibly blocking the ports or duct as a result.

The alkali cellulose subsequently passes down the second mass and is removed from the bottom of that mass by the second extractor mechanism 3, whence it is collected by a conveyor 12 and taken to the next stage of the viscose preparation process.

Within the scope of the invention, the shape and dimensions of the tower may be varied between fairly wide limits. Since, however, the maximum width of the tower is limited by the length of extraction rolls available, it is preferred that the tower be rectangular in cross-section. A typical tower is 9 feet wide, 30 feet long and 18 feet tall. In this latter tower, the depth of alkali cellulose in each mass could conveniently be about 6 feet. The total retention time of alkali cellulose in the tower could then be of the order of 18 hours. It is, of course, possible in a taller tower to provide more than one intermediate extractor mechanism with associated aeration means.

The extraction rolls may rotate intermittently and through only a portion of a revolution each time they move, or continuously. For example, they may rotate through one fifth of a revolution each time, the overall speed being of the order of 1 revolution every 10 minutes, for example.

It will be appreciated that the present invention not only provides a method of making use of the upper regions of a tower of height substantially greater than the maximum possible alkali cellulose depth, but simultaneously provides an apparatus which can accept a greater throughput per unit of cross-sectional area than that possible with the ageing towers hitherto used.

What is claimed is:

1. Apparatus for ageing alkali cellulose comprising a tower of uniform cross-section, a feed opening adjacent the upper end of the tower, a carriage adapted to reciprocate across the feed opening, a reversible conveyor supported by the carriage, a discharge opening adjacent the lower end of the tower, at least one extractor disposed between the ends of the tower, a final extractor across the discharge opening, each of which extractors comprises a plurality of parallel transverse rotary shafts each carrying a plurality of pickers, and a gas inlet from outside the tower below each extractor except the final extractor, whereby external gas is introduced into the tower.

2. Apparatus for ageing alkali cellulose comprising a tower of uniform cross-section, a feed opening adjacent the upper end of the tower, a carriage adapted to repricocate across the feed opening, a reversible conveyor supported by the carriage, a discharge opening adjacent the lower end of the tower, at least one extractor disposed between the ends of the tower, a final extractor across the discharge opening, each of which extractors comprises a plurality of parallel transverse rotary shafts each carrying a plurality of pickers, a gas duct substantially encircling the tower below each extractor except the final extractor and a plurality of inlets from outside the tower connecting each duct with the interior of the tower, whereby external gas is introduced into the tower.

References Cited by the Examiner

UNITED STATES PATENTS

| 2,490,097 | 12/1949 | Seaman et al. | 23—283 X |
| 3,051,560 | 8/1962 | Barboza | 23—284 |

FOREIGN PATENTS

| 1,039,476 | 5/1953 | France. | |

MORRIS O. WOLK, *Primary Examiner.*

JAMES H. TAYMAN, Jr., *Examiner.*